(12) United States Patent
Richardson et al.

(10) Patent No.: US 7,162,481 B2
(45) Date of Patent: Jan. 9, 2007

(54) METHOD FOR INCREASING STORAGE CAPACITY IN A MULTI-BIT TRIE-BASED HARDWARE STORAGE ENGINE BY COMPRESSING THE REPRESENTATION OF SINGLE-LENGTH PREFIXES

(75) Inventors: Nicholas Julian Richardson, San Diego, CA (US); Suresh Rajgopal, San Diego, CA (US); Lun Bin Huang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 589 days.

(21) Appl. No.: 10/313,854

(22) Filed: Dec. 6, 2002

(65) Prior Publication Data
US 2004/0111440 A1   Jun. 10, 2004

(51) Int. Cl.
*G06F 17/00* (2006.01)
*G06F 7/00* (2006.01)
(52) U.S. Cl. .............................. 707/101; 707/3; 707/4
(58) Field of Classification Search ............... 707/1–3, 707/4, 6, 7, 100–104.1; 709/202, 218, 238, 709/239, 241, 245, 247; 711/108, 221; 370/28, 370/389
See application file for complete search history.

(56) References Cited

U.S. PATENT DOCUMENTS

| 5,857,196 A | | 1/1999 | Angle et al. |
| 6,014,659 A | * | 1/2000 | Wilkinson et al. ............. 707/3 |
| 6,067,574 A | * | 5/2000 | Tzeng ......................... 709/247 |
| 6,275,927 B1 | * | 8/2001 | Roberts ...................... 712/213 |
| 6,385,649 B1 | * | 5/2002 | Draves et al. ............... 709/224 |
| 6,560,610 B1 | * | 5/2003 | Eatherton et al. ......... 707/104.1 |
| 6,571,313 B1 | * | 5/2003 | Filippi et al. ................ 711/108 |
| 6,697,363 B1 | * | 2/2004 | Carr ............................ 370/389 |
| 6,782,382 B1 | * | 8/2004 | Lunteren ........................ 707/3 |
| 6,888,838 B1 | * | 5/2005 | Ji et al. ....................... 370/401 |
| 6,928,430 B1 | * | 8/2005 | Chien et al. .................... 707/3 |
| 6,934,252 B1 | * | 8/2005 | Mehrotra et al. ........... 370/229 |

FOREIGN PATENT DOCUMENTS

| EP | 0 408 188 A2 | 1/1991 |
| EP | 1 168 723 A2 | 1/2002 |
| WO | WO 98/41931 | 9/1998 |

OTHER PUBLICATIONS

Henry Hong-Yi Tzeng, On Fast Address-lookup Algorithms, Jun. 1999, IEEE, vol. 17, No. 6, pp. 1067-1082.*
Miguel A. Ruiz-Sanchez et al., Survey and Taxonomy of IP Address Lookup Algorithms, Mar./Apr. 2001, IEEE, pp. 8-23.*

* cited by examiner

*Primary Examiner*—Jeffrey Gaffin
*Assistant Examiner*—Jacques Veillard
(74) *Attorney, Agent, or Firm*—Lisa K. Jorgenson; William A. Munck

(57) ABSTRACT

Prefixes terminating with end node entries each containing identical length prefix portions in a single child table are compressed by replacing the end node entries with one or more compressed single length (CSL) prefix entries in the child table that contain a bitmap for the prefix portions for the end node entries. A different type parent table trie node entry is created for the child table. Where the prefix portions are of non-zero length, the parent table contains a bitmap indexing the end node entries. Where the prefix portions are of length zero, the parent table may optionally contain a bitmap for the prefix portions, serving as an end node. The number of prefix portions consolidated within the CSL node entry is based upon the prefix portion length.

24 Claims, 5 Drawing Sheets

| Node type | | | | | | | | | |
|---|---|---|---|---|---|---|---|---|---|
| trie node, normal | ct_bitmap (16 bits) | | | | | child_ptr (20 bits) | | | 0000 |
| trie node with inode | ct_bitmap (16 bits) | | | | | child_ptr (20 bits) | | | 0001 |
| trie node, PC, skip 3 | pattern, 16 bit | | | | | child_ptr (20 bits) | | | 0010 |
| trie node, PC, skip 2 | pattern, 12 bit | | | xxx0 | | child_ptr (20 bits) | | | 0011 |
| trie node, PC, skip 1 | pattern, 8 bit | | xxxx | xxx1 | | child_ptr (20 bits) | | | 0011 |
| trie node, CL0 (length 0) | pattern, 16 bit | | | | | child_ptr (20 bits) | | | 0100 |
| end node, CL0 (length 0) | 16 bit L0 bitmap for e1 - e16 | | | | | nexthop_ptr (20 bits) | | | 0100 |
| trie node, CL1 (length 1) | ct_bitmap (16 bits) | | | | | child_ptr (20 bits) | | | 0101 |
| trie node, CL2 (length 2) | ct_bitmap (16 bits) | | | | | child_ptr (20 bits) | | | 0110 |
| trie node, CL3 (length 3) | ct_bitmap (16 bits) | | | | | child_ptr (20 bits) | | | 0111 |
| end node | 0 | nh_bitmap (15 bits) | | | | nexthop_ptr (20 bits) | | | 1000 |
| inode (internal node) | 0 | nh_bitmap (15 bits) | | | | nexthop_ptr (20 bits) | | | 1001 |
| CSL node, for CL0 trie node | 16 bit L0 bitmap for e1 - e16 | | | | | nexthop_ptr (20 bits) | | | 1110 |
| CSL node, for CL1 trie node | e1 | e2 | e3 | e4 | e5 | e6 | e7 | e8 | nexthop_ptr (20 bits) | 1110 |
| CSL node, for CL2 trie node | e1 bm | | e2 bm | e3 bm | | e4 bm | nexthop_ptr (20 bits) | | 1110 |
| CSL node, for CL3 trie node | e1 bitmap | | | e2 bitmap | | | nexthop_ptr (20 bits) | | 1110 |
| header | unused (16 bits) | | | | | parent_ptr (20 bits) | | | 1111 |

FIGURE 4

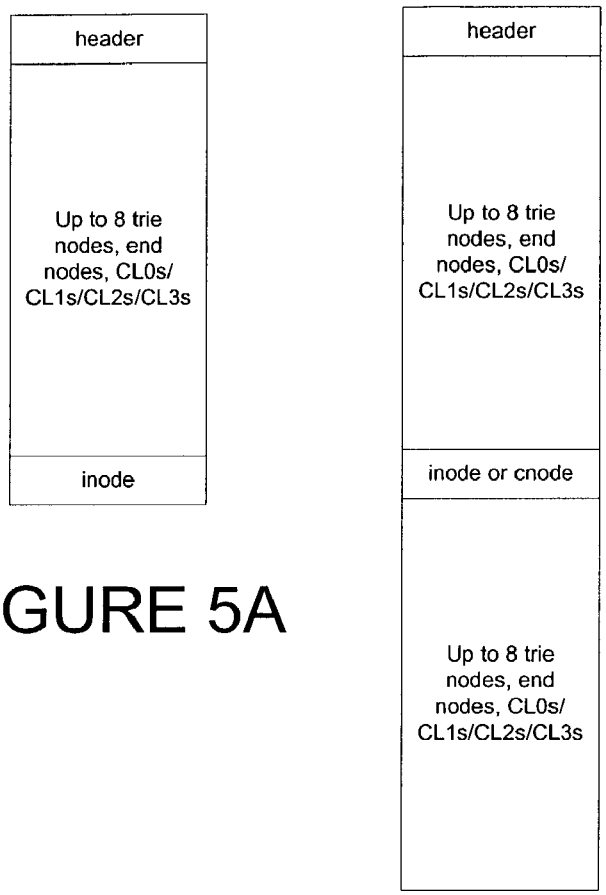

METHOD FOR INCREASING STORAGE CAPACITY IN A MULTI-BIT TRIE-BASED HARDWARE STORAGE ENGINE BY COMPRESSING THE REPRESENTATION OF SINGLE-LENGTH PREFIXES

TECHNICAL FIELD OF THE INVENTION

The present invention is directed, in general, to tree-based data structures employed, for example, in looking up Internet Protocol forwarding addresses and, more specifically, to bitmapped multi-bit tries.

BACKGROUND OF THE INVENTION

A trie (from the middle four letters of "retrieve") is a hierarchical data storage structure for storing and retrieving information items. The stored items consist of an address-prefix (normally referred to as just "prefix") plus data, where the prefix is employed as a tag for identifying the associated data (i.e., the prefix is similar to a file name, and the data is like the file contents). An item's data is retrieved by searching for the associated prefix with the value of the prefix as the search key (similar to finding a file based on knowledge of the filename and then retrieving the file's contents).

Prefixes in trie structures are hierarchically organized according to numeric value into an easily searchable tree structure. In single bit (or unibit) tries, each bit within the prefix defines which branch is to be followed at the corresponding level of the data structure hierarchy, and is constrained in access speed by the need to read each bit. Multi-bit (or expanded) tries use several bits, referred to as the stride length, at a time during searching to improve access speed, requiring that prefixes of a size less than an exact multiple of the stride length be expanded to the next stride length boundary.

Bitmapped multi-bit tries employ bitmaps to eliminate redundant information, and thus reduce the amount of memory and operations required to hold and update the trie. While compact and easily modifiable, further reduction in the amount of memory required to represent a trie holding a given number of prefixes are possible.

There is, therefore, a need in the art for improving bitmapped multi-bit tries and the use of such structures.

SUMMARY OF THE INVENTION

To address the above-discussed deficiencies of the prior art, it is a primary object of the present invention to provide, for use in a network router, compression of prefixes terminating with end node entries each containing identical length prefix portions in a single child table by replacing the end node entries with one or more compressed single length (CSL) prefix entries in the child table that contain a bitmap for the prefix portions for the end node entries. A different type parent table trie node entry is created for the child table. Where the prefix portions are of non-zero length, the parent table contains a bitmap indexing the end node entries. Where the prefix portions are of length zero, the parent table may optionally contain a bitmap for the prefix portions, serving as an end node. The number of prefix portions consolidated within the CSL node entry is based upon the prefix portion length.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the detailed description of the invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates table entry formats for use within multi-bit tries having compressed single length end nodes according to one embodiment of the present invention;

FIGS. 5A and 5B illustrate table structures for multi-bit tries having compressed single length end nodes according to one embodiment of the present invention;

FIG. 7 illustrates table structures for multi-bit trie child tables having compressed single length end nodes according to one embodiment of the present invention.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
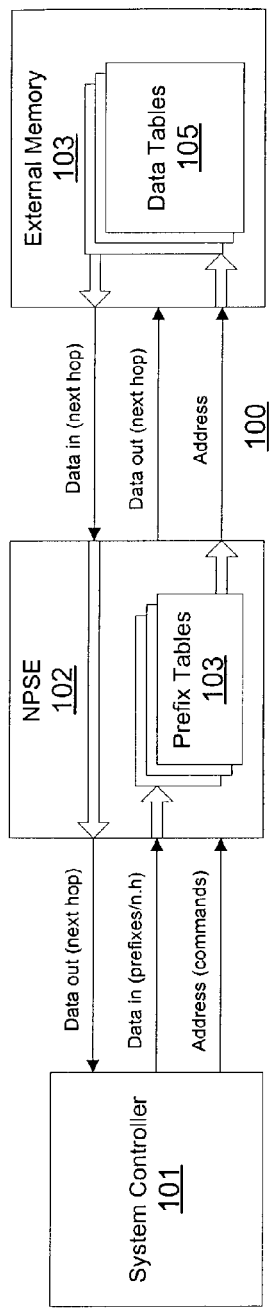
FIG. 1 depicts a processing system utilizing bit-mapped trie-based storage with remappable prefix representations according to one embodiment of the present invention.

FIG. 1 depicts a processing system utilizing bit-mapped trie-based storage with compressed single length end nodes according to one embodiment of the present invention. Processing system 100 implements a portion of an Internet Protocol (IP) network router and includes a system controller 101 coupled to a network packet search engine (NPSE) 102, which in turn is coupled to external memory 103. NPSE 102 receives addresses for commands from system controller 101 as well as prefixes for the next hop address, and returns the next hop address to system controller 101. NPSE 102 transmits data table memory addresses to external memory, together with a data pointer to the next hop address within a data table, determined from prefix tables 104, to external memory 103. NPSE 102 receives from external memory 103 the next hop address from the table and entry within data tables 105 identified by the address and data pointer.

NPSE 102 is preferably coupled to system controller 101 by a high-speed 32-bit network processor unit (NPU) interface and to external memory 103 by a high speed 32-bit static random access memory (SPAM) interface. Each interface is implemented by a quad data rate (QDR) architecture, with the system controller 101 as the master for the NPU interface and the external memory 103 as the slave for the SRAM interface, providing 32 bit simultaneous data input/output (I/O) at two words per clock with a maximum clock frequency of 250 megahertz (MHz) for peak aggregate bandwidth of 4.5 gigabytes/second (GB/s).

Figure 2:
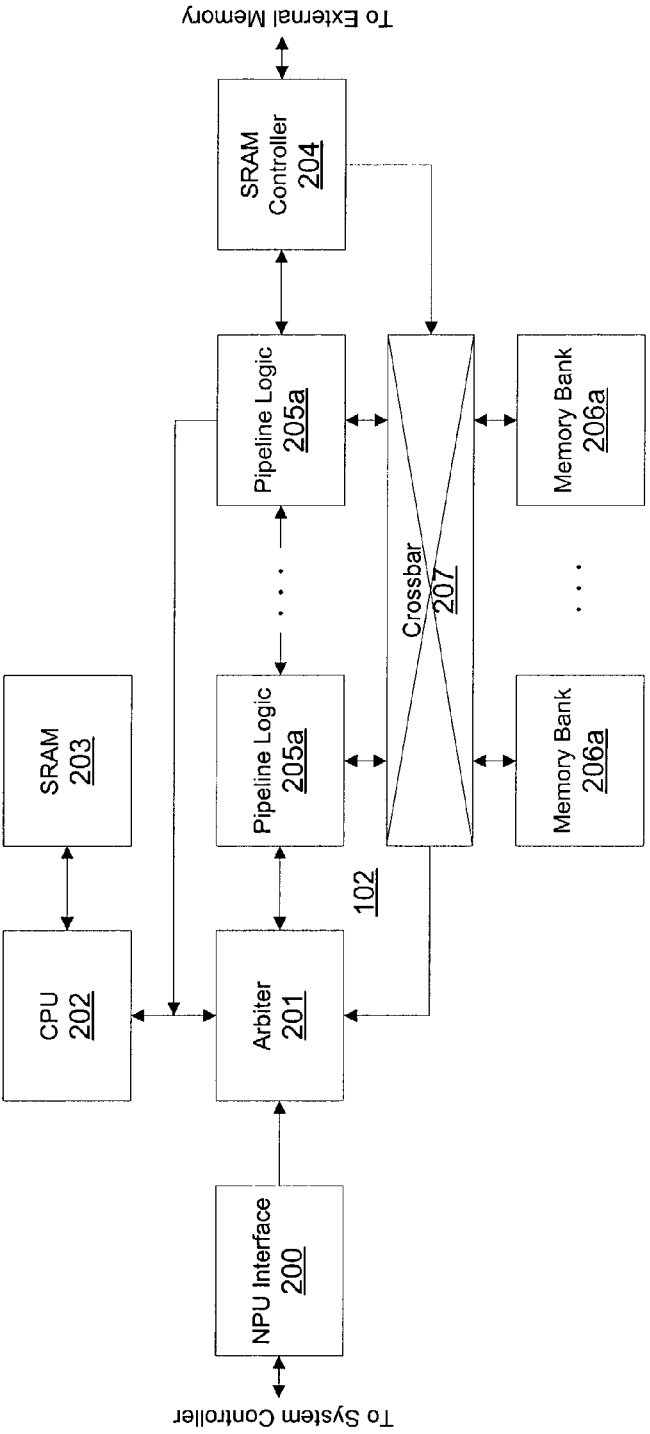
FIG. 2 depicts a network packet search engine within a processing system utilizing bit-mapped trie-based storage with remappable prefix representations according to one embodiment of the present invention.

FIG. 2 depicts a network packet search engine within a processing system utilizing bit-mapped trie-based storage with compressed single length end nodes according to one embodiment of the present invention. NPSE 102 includes: an NPU interface 200 coupling the NPSE 102 to the system controller 101; an arbiter 201; a central processor unit (CPU) 202 with associated memory (SRAM) 203 containing the programs executed by CPU 202; an SRAM controller 204 coupling the NPSE 102 to the external memory 103; and an array (sixteen in the exemplary embodiment) of pipeline logic units 205a–205n and a corresponding set (also sixteen in the exemplary embodiment) of configurable memory blocks 206a–206n forming a series of virtual memory banks, with pipeline logic units 205a–205n and memory blocks 206a–206n coupled by a crossbar 207 enabling the virtual bank configurations. The major tasks performed by NPSE 102 are route insert, delete and search, which expect NPSE 102 to maintain the routing table by inserting routes into and deleting routes from the internal and external memory, and to perform a route search on the prefixes presented and return the associated next hop information.

The NPSE 102 improves organization and encoding of prefixes within a multi-bit trie in prefix memory, defining a "remappable multi-bit trie." In the present invention, the amount of prefix memory required to hold the multi-bit trie is reduced, thus reducing the cost of the device that implements the multi-bit trie in a hardware embedded memory. The prefix memory required to hold the multi-bit trie is reduced by improving on bit-mapped multi-bit tries, and thus also inherits the advantages of that algorithm which include an already memory-efficient prefix storage mechanism. The present invention also provides very good update times compared to other multi-bit trie implementations.

The standard multi-bit trie is a tree-based data structure created in the prefix and data memory to facilitate sorting and searching for prefixes according to numeric value, thus enabling a prefix of a particular value and the associated data to be quickly located by searching for a stored prefix matching a search-key. Prefixes are divided into segments of a small number of bits; for example, a 32-bit prefix may be logically divided into eight 4-bit segments. Prefixes are then hierarchically organized by segment values.

When entering a new prefix into a trie, or searching for an existing prefix, the prefix is processed one segment at a time. In the present invention, segments are all equally sized and are processed from left to right (most-significant to least-significant segment), although neither condition is a general restriction of multi-bit tries.

To enter a new prefix into a multi-bit trie, a table is created in the prefix memory for the prefix's first (i.e., most-significant or left-most) segment. If the prefix's segments have n bits (e.g., n=4), then the table created must have $2^n$ entries (e.g., $2^4$=16), one entry for each possible value of the segment. The entry within this table corresponding to the actual value of the new prefix's first segment is marked valid and a memory pointer, known as a "child-pointer," pointing to a second table, known as a "child table," is placed within that entry. The table entry containing the child-pointer is known as a trie-node.

The child table also has $2^n$ entries, one entry for each possible value of the new prefix's second (next to most-significant) segment. The entry within the child table corresponding to the value of the new prefix's second segment is marked valid, and a child-pointer to a third table (i.e., the child table of the second table) is placed in the entry to form another trie-node. This process continues in like manner for subsequent prefix segments until a table for the prefix's final (least significant) segment is created.

The entry in the final table that corresponds to the value of the prefix's final segment is marked as valid, but instead of a child-pointer to a new prefix table in prefix memory, the pointer, known as a "data-pointer," to a separate memory, the data memory, is placed therein. This type of entry is known as an end-node since it terminates the representation of the prefix. The end-node points to the location in data memory that contains the actual data associated with the prefix, and which will be retrieved when a search for the prefix's value is performed. Since the end-node terminates representation of the prefix and identifies the prefix's data, the end-node may be regarded as representing the actual prefix placed in the multi-bit trie.

The procedure described above is repeated each time a new prefix is entered into the trie. It is important to note that a new child table is created each time a new prefix is entered into the multi-bit trie and the point at which the prefix's value is found to differ from the value of any existing prefix while processing the prefix segments from left to right. This causes a tree of tables to be built for a particular value of all previous segments, with any given table effectively being a list of valid values for the prefix-segment associated with that table.

Once at least one prefix and the associated data has been entered into the trie, the algorithm allows for searching for a prefix of a given value (search key) in order to retrieve the associated data. The procedure to find a stored prefix matching a given search key is almost the same as that for entering a new prefix, except that no new tables or table entries are created. Instead, an existing chain of valid tables and their child-pointers corresponding to the search key's segment values is followed until either an entry containing a data pointer is encountered, in which case the data pointed to is returned as a result along with a "match found" status indicator, or a non-existent table-entry is encountered, in which case the search fails with a "no match found" status indicator.

To generalize, if a multi-bit trie stores prefixes of up to m segments, with each segment being n bits wide, then an m-level tree of tables, each with $2^n$ entries, is employed. Only one first-level (level 1) table exists, since the first-level table has no parent, with n trie-node entries containing child pointers, one for each value of the first segment, pointing to up to n child (level 2) tables. Each second-level (level 2) table in turn has n trie-node entries pointing in total to up to $n^2$ level 3 tables, and so on up to the last (mth) level of tables, of which there can be, in theory, up to $n^m$. Each table entry comprising a trie-node (child pointer) or end-node (data pointer) has an implicit segment-value corresponding to the entry's position within the respective table, and represents one of $2^n$ possible values of the corresponding n-bit prefix segment. When a prefix p is stored in the trie, the first n-bit segment of value $V_1$, is used as an index into the level 1 table to create an entry corresponding to $V_1$, which points to a second-level table. The second n-bit segment of value $V_2$ is then used as an index into that second-level table to create an entry corresponding to $V_2$, which points to a third-level table, and so on up to the final table entry required to represent the prefix of a given length, which contains an end-node containing a data pointer instead of a trie-node. Thus the full value represented by any entry in a table at a given level L is the positional segment value $V_L$, concatenated with the table's parent-entry positional segment value $V_{L-1}$, concatenated with the table's grandparent-entry positional segment value $V_{L-2}$, and so on up to the positional segment value of the level 1 table entry.

Among the advantages of standard multi-bit tries are fast search times (the time taken to find a prefix that matches a search key), which is proportional to the number of prefix segments (fixing the number of trie levels). Typically the number of prefix segments is relatively few, so that search times are both fast independent of the number of prefixes in the table.

Standard multi-bit tries also produce a small prefix memory footprint. Prefixes having overlapping segment values, so that some contiguous segments from the first segment downward all have the same values, share the same table entries for those contiguous same-value segments due to the hierarchical nature of the algorithm, where a new table entry containing either a trie-node pointing to a new table or an end-node is inserted only at the point where the value of a segment differs from the values of corresponding segments for any previously-entered prefix. This potentially saves a great deal of memory over alternative methods (such as use of Content Addressable Memory or "CAM") which assign new memory locations for every prefix bit. Additionally, prefixes that are shorter than the maximum length m*n (i.e., have fewer segments than the maximum number of trie levels) only use the same number of table entries as they have n-bit segments, thus saving memory over methods that use fixed-length storage corresponding to the maximum length prefix.

Disadvantages of the standard multi-bit trie include waste of prefix table entries. When a new table is created, n entries are always reserved even though as little as only one entry may be used. Because table entries are accessed by their corresponding segment as an index into the table, unused table entries must be placed in the table to preserve the correct offset for the occupied entry or entries, as well as to indicate which segment values are invalid in order to correctly terminate table searches.

Standard multi-bit tries cannot handle prefixes that are not a multiple of the segment length. As noted earlier, prefixes may be of any length up to the maximum trie depth times the segment length (m*n). If a prefix is less than m*n bits in length, say 3n bits long, then the prefix will terminate after less than the maximum number of trie levels. However, if the prefix length is not a multiple of n, then an ambiguity over which entry in the final table to select arises since the prefix would terminate with a partial length segment insufficient to select one of the n final table entries.

Standard multi-bit tries also cannot handle prefixes with values that are fully overlapped by the values of longer prefixes (e.g., prefix 1="12345", prefix 2="123"). In this case, the tables would have to handle table entries that contain both a trie-node (to point to a child table for the longer prefix) and an end-node (to terminate the shorter prefix's pointer chain by pointing to the associated data).

Bit-mapped multi-bit tries improve on the standard multi-bit trie by solving the three disadvantages described above. A child table's empty entries caused by the prefix segment indexing scheme are eliminated by creating a bitmap associated with the trie-node in the parent table that points to the child table. The bitmap indicates which of the child table's entries are valid, and is used to compress the index into the child table using a combination of the child table's prefix segment and the bitmap of valid entries in the trie-node.

Prefixes that are not a multiple of the segment length n are handled in bit-mapped multi-bit tries by a special bitmap associated with the prefix's end nodes, by making each end node in a table at a given level L handle prefixes that are from L*n up to (L*n)+(n−1) bits long (instead of just L*n bits long, as in standard multi-bit tries). For instance, if an end node in the third level of a multi-bit trie having a prefix segment length of 4, normally the end node would only point to data for a single prefix of length L*n=3*4=12 bits. However, the same end node in a bit-mapped multi-bit trie would encode prefixes from length L*n=12 bits to length (L*n)+(n−1)=15 bits. The data pointer in such an end node would be shared among the multiple length prefixes encoded by the bitmap.

Note, however, that this new type of end node must encode all possible values of prefixes longer than the end node's positional value L*n. Thus there must be one bit in the bitmap for a prefix of length L*n, plus two bits for prefixes of length L*n+1 (i.e., L*n__0 and L*n__1), plus four bits for prefixes of length L*n+2 (i.e., L*n__00, L*n__01, L*n__10 and L*n__11), and so on up to $2^{n-1}$ prefixes of length (L*n)+(n−1). For instance, in the example of L=3 and n=4, an end node in the third level table would handle one prefix of length 12 bits, two prefixes of length 13 bits, four prefixes of length 14 bits, and eight prefixes of length 15 bits (up to fifteen prefixes total). In this case, a 15 bit bitmap in the end node would be needed to define which of the fifteen possible prefixes of length 12, 13 14 and 15 bits are actually valid, and hence the number of data items in data memory (up to 15) that are associated within the data pointer in the end node. So the validity of a prefix of a particular length and value is determined not only by the positional value of the end node's table entry, but also by the bit corresponding to the particular length and value in the end node's bitmap. Thus, each bit in an end node's bitmap may be thought of as a prefix bit representing a unique prefix of a particular length and value. If a prefix bit in the end node bitmap is found to be valid, then the associated data item is retrieved from data memory by counting the number of valid bits in the data pointer bitmap up to but not including the valid bit for the prefix bit in question, and adding that as an offset to the value of the end node's data pointer.

The problem of handing short prefixes whose values are fully overlapped by the values of longer prefixes across at least one segment boundary is solved in bit-mapped multi-bit tries by the concept of end node pushing. In this situation, the final table entry of the shorter prefix's contains an end node to identify the data item for that prefix. However, the exact same table entry for the longer prefix 1 must contain a trie node to point to the table for 1's next full prefix segment. Therefore, because any given table entry can potentially be in the path of overlapping prefixes, where one prefix ends at that entry and another prefix continues, each entry must be able to hold both a trie node and an end node, necessitating that two locations per table entry be reserved even though only one will be used when in the path of non-overlapping prefixes. This would greatly reduce the capacity for prefix storage of any given amount of prefix memory. (Note that if two prefixes do not overlap across a segment boundary, then they will be represented by two different prefix bits in the single end node's bitmap and would not require the use of both a trie node and an end node).

The problem is solved by moving (or "pushing") the shorter prefix's end node from the original shared table entry into a special entry in the child table of the longer prefix, which can be identified from the child pointer in the longer prefix's trie node. The pushed end node becomes known as an internal node or "inode" since the end node represents prefixes that terminate in the midst of a trie node pointer chain instead of at the end. This inode is an additional entry in the child table, but is only added when necessary (i.e., when there are fully overlapping prefixes), thus solving the problem of having to reserve space for both a trie node and an end node per table entry. The format of the inode is exactly the same as a normal end node; the only difference is that the inode is placed in a table that represents the next prefix segment relative to the inode's unpushed location in the parent table, even though the inode still represents values of the previous segment—i.e., the same one as before being pushed.

When following a prefix's path through multiple tables, the inode entry of each table is always retrieve in addition to the required normal entry of each table so that two entries per table are read during the course of each search. This allows the prefixes encoded by each inode's prefix bits in their bitmap to be tested for match to the corresponding search key segment values while simultaneously searching for longer matching prefixes. In the case where more than one match is obtained due to a search key matching multiple prefixes of different lengths with fully overlapping values, then the data for the longest matching prefix is returned. This is useful for some applications such as network router look-up tables, and is known as "longest prefix match."

The disadvantages of bit-mapped multi-bit tries are that underutilized tables may be created. If prefix values are sparsely distributed, then many tables may be created handling only a few prefixes (typically one or two) but still incurring the overhead of a full table, including a pointer to the parent table's trie node and a header word for memory management and maintenance purposes.

Bit-mapped multi-bit tries may also result in creation of underutilized end nodes and inodes under the condition of spare prefix distribution. Even if a table contains a number of end nodes, each capable of pointing to many prefixes' data items (identified by the bitmap), under conditions of sparse prefix distribution each end node may point to many less data items than the maximum capability for an end node, leading to poor utilization of the end node and their bitmaps.

Bit-mapped multi-bit tries may also result in underutilized end nodes under conditions where many of the prefixes stored by a table are of fixed length. In this case, the prefix bits in the end node bitmaps that define prefixes of n different lengths (where n is the segment size) will only be used to define prefixes corresponding to one value of n. The other bits in the bitmap will be unused, the end node's data pointer will be underutilized, pointing to fewer than the maximum possible number of data items.

Figure 3:
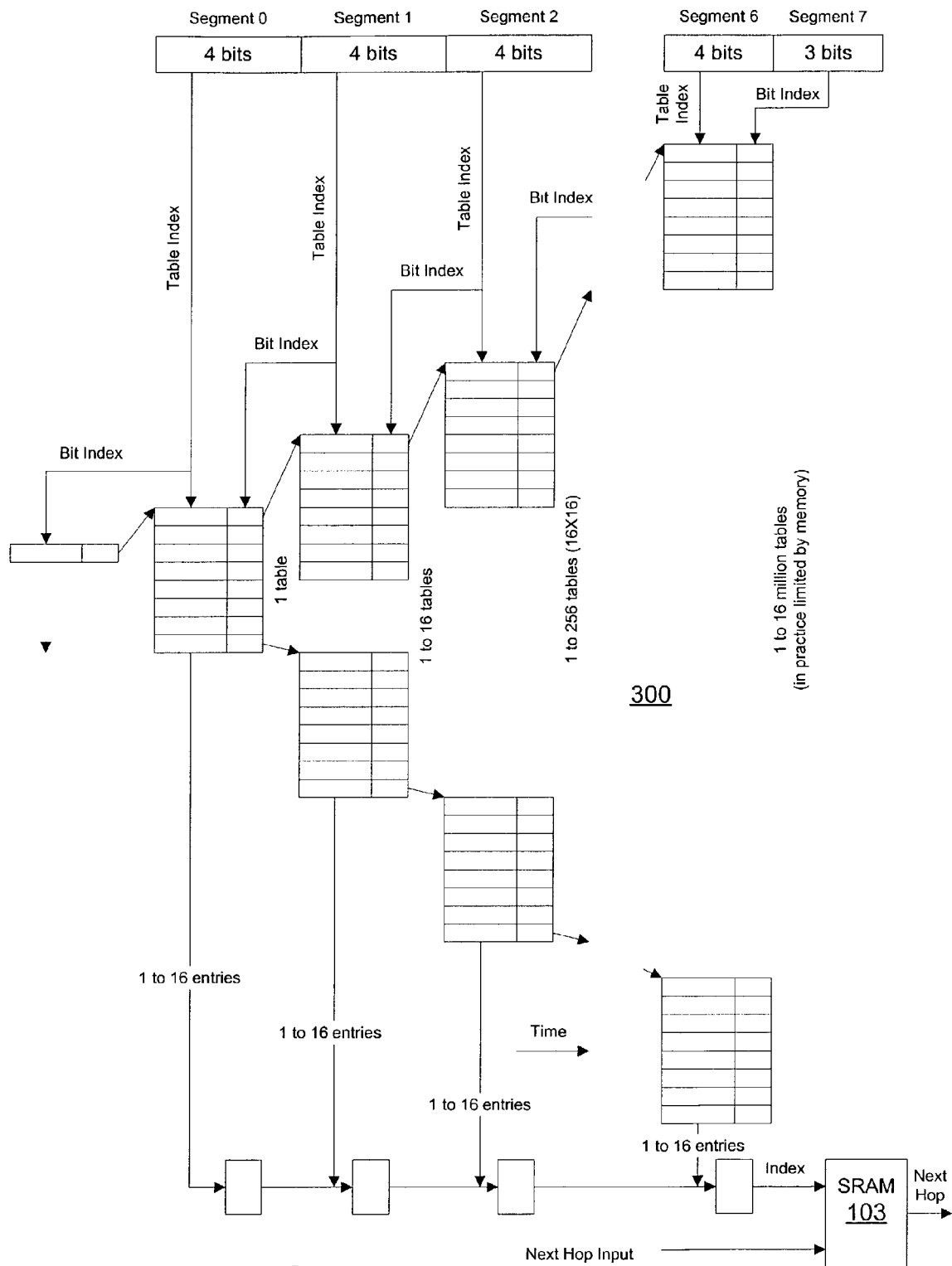
FIG. 3 illustrates a bit-mapped trie-based storage with compressed single length end nodes according to one embodiment of the present invention.

FIG. 3 illustrates a bit-mapped trie-based storage with compressed single length end nodes according to one embodiment of the present invention. As described above, bit-mapped multi-bit tries are compact and easily modifiable, employing bitmaps to eliminate redundant or unnecessary information and thereby reduce the amount of memory and operations required to hold and update the trie. The present invention improves on that method still further to significantly reduce the amount of memory required to represent a trie holding a given number of prefixes. The present invention allows prefixes in the internal memory to be compressed into a more compact form provided that the prefixes represented by a given table are all of the same length, which typically is a common occurrence, and also allows remapping from a bit-mapped representation into a "partial-prefix" representation, which saves prefix memory in certain cases.

Remappable multi-bit trie 300 logically divides an Internet Protocol version 4 (IPv4) address prefix into seven segments 0–7, six of 4 bits and one (the last) of 3 bits. Prefixes are stored as 4 bit segments in separate tables or table-entries, with prefix length defined by the number of tables used to define the prefix (left to right). Each prefix segment has a table entry for every value of the previous segments for that prefix, with prefixes that share the same values of the top segments also sharing table entries. Special bitmap encoding techniques are used to further reduce table size. Searches use the actual value of search key segments to navigate the tables by 4 bit indexing, and pipeline registers can be placed between tables for high throughput. The tables may use ordinary SRAM, with 16 megabits (Mb) holding at least 512K IPv4 prefixes.

FIG. 4 illustrates table entry formats for use within multi-bit tries having compressed single length end nodes according to one embodiment of the present invention. The NPSE table and node formats for the exemplary embodiment include five standard table-entry formats described in greater detail below, including header, trie node, trie node with inode/cnode, inode and end node. In addition there is a compressed node format described below allowing better table optimization for various prefix distributions, particularly fixed length distributions. The four least significant bits (status or type field) specify the table entry type.

FIGS. 5A and 5B illustrate table structures for multi-bit tries having compressed single length end nodes according to one embodiment of the present invention. The formats of tables held in the NPSE's internal memory are based on words of 40 data bits plus one parity bit, with a maximum of 18 entries per table. In each NPSE pipeline stage, two 40-bit words are read from memory simultaneously. The table formats ensure that the word locations read have a maximum intervening gap of seven locations between them, which allows each memory to be organized as two banks of odd and even 8 word locations, with each bank being independently addressable and with any two words being output from the 16 accessed internally being output on each memory read.

FIG. 5A illustrates the normal table format for up to eight entries. The table includes, in sequence, a header entry, up to eight regular entries, and an optional internal node (inode) entry. The regular entries may be trie nodes, end nodes, Compressed Single Length (CSL) nodes.

FIG. 5B illustrates the normal table format for nine to sixteen entries. The table includes, in sequence, a header entry, eight regular entries (which may be trie nodes, end nodes, or CSL nodes), an optional inode entry, and up to eight additional regular entries (which also may be trie nodes, end nodes, or CSL nodes).

Referring back to FIG. 4, a normal trie node is the node normally used to point to a child table from a parent table, consisting of a 16 bit child table bitmap ($ct_{13}$ bitmap) that defines which of the 16 possible child table entries are valid. Each bit in the child table bitmap corresponds to one value of the child tables 4 bit prefix segment, from 0 to 15, with which each of the respective 16 possible child table entries is associated. A 20 bit child pointer ($child_{13}$ ptr) points to the header of the child table. This format excludes the use of an inode, cnode or pnode in the child table.

The trie node with inode is the same as the normal trie node, with the exception that the entry points to the header of a child table containing an inode. For tables with up to 8 normal entries, the inode is placed at the end of the table as shown in FIG. 5A. For tables with more than 8 normal entries, the inode is placed after the eighth entry using the split-table format shown in FIG. 5B. This information is used to calculate the correct address of entries above the inode for split-format tables.

Trie nodes for child tables with single length prefixes (CL0, CL1, CL2 or CL3) are trie nodes used to point to child tables that consist exclusively of end nodes that all contain prefixes of the same length. These prefixes may be either 0, 1, 2 or 3 bits longer than the value of the current parent trie node, for which a CL0, CL1, CL2 or CL3 type parent trie node is used respectively. This allows up to 16 prefixes to occupy each end node in the child table, as opposed to only 1, 2, 4, or 8 length 0, 1, 2 or 3 prefixes per end node respectively if using the normal format. The main use of these entries is to improve end node utilization for tables that contain all or mostly single length prefixes, although the entries may also be used to improve utilization of mixed length tables.

The CL0 node is a special case that can be either a trie node that points to a child table containing up to 16 length 0 prefixes, or a parent table end node that actually contains the prefixes, thus eliminating the child table. The trie node version is used if there is an inode associated with the parent table entry, and the end node version if there is not. The two types are distinguished by the parent bitmap field being set to zero for the trie node version, or having at least one bit set for the end node version.

The inode contains up to 15 prefixes that are 0, 1, 2 or 3 bits longer than the value of the parent trie node. Since the prefixes' values are completely defined by their position within the inode's next hop bitmap (nh_bitmap) field, the inode's position in the child table is not important. However, in order to maintain a uniform child table access method, the inode is always placed after all the regular trie nodes and end nodes in tables containing up to eight normal entries, and always after the eighth trie node/end node in tables with nine to sixteen entries.

Each bit in the inode's nh_bitmap field defines whether one of up to fifteen prefixes with a particular length and value is valid or not (1=valid, 0=invalid) Lengths and values are defined as shown in TABLE I (L=parent node length, p=parent trie node value):

TABLE I

| nh_bitmap [15:0] | Prefix Length | Prefix Value |
|---|---|---|
| 15 | N/A | 0 = inode has no associated value<br>1 = inode has associated value that shares its nexthop_ptr |
| 14 | L | p |
| 13, 12 | L + 1 | p_1, p_0 |
| 11, 10, 9, 8 | L + 2 | p_11, p_10, p_01, p_00 |
| 7, 6, 5, 4, 3, 2, 1, 0 | L + 3 | p_111, p_110, p_101, p_100, p_011, p_010, p_001, p_000 |

The nexthop_ptr field in an inode points to the beginning of a record in external next hop memory that holds the data associated with each of the valid prefixes in the inode. Hence nh_bitmap is used to form an index into that record.

An end node has a format similar to that of an inode, but defines prefixes that are longer than those defined by an inode in the same table. Each of the 15 prefixes are either 4, 5, 6 or 7 bits longer than the prefix segment of the parent table. The value of the prefixes is dependent both on the prefix's bit position in the end node's nh_bitmap field, as well as the end node's bit position, from 15 to 0, in the ct_bitmap field of the parent trie node.

Each bit in the end node's nh_bitmap field defines whether one of up to 15 prefixes with a particular length and value is valid (1=valid, 0=invalid). Lengths and values are defined as shown in TABLE II (L=parent node length, p=parent trie node value, c=value of end node in parent's ct_bitmap field, "_"=append):

TABLE II

| nh_bitmap [15:0] | Prefix Length | Prefix Value |
|---|---|---|
| 15 | N/A | 0 = inode has no associated value<br>1 = inode has associated value that shares its nexthop_ptr |
| 14 | L + 4 | p_c |
| 13, 12 | L + 5 | p_c_1, p_c_0 |
| 11, 10, 9, 8 | L + 6 | p_c_11, p_c_10, p_c_01, p_c_00 |
| 7, 6, 5, 4, 3, 2, 1, 0 | L + 7 | p_c_111, p_c_110, p_c_101, p_c_100, p_c_011, p_c_010, p_c_001, p_c_000 |

The nexthop_ptr field in an end node points to the beginning of a record in external next hop memory that holds the data associated with each of the valid prefixes in the inode. Hence nh_bitmap is used to form an index into that record.

Compressed Single Length (CSL) nodes are end nodes associated with CL0, CL1, CL2 or CL3 type trie nodes in their parent tables. CSL nodes have the same format as a normal end node with the exception that all 16 bits in the nh_bitmap field are valid, instead of 15 bits. The mapping of the prefix bits to corresponding prefix values in the CSL node's bitmap field is different than that of an ordinary end node, and is shown in TABLE III (p=parent trie node value, c[3:0]=position of child table prefix segment in parent's ct_bitmap field, "_"=append, and "x" would take the value 0 or 1):

TABLE III

| Type | Value of Each CSL Node Prefix in nh_bitmap[15:0], |
|------|---------------------------------------------------|
| CL0  | p_c = [0000], p_c = [0001], p_c = [0010], p_c = [0011], p_c = [0100], p_c = [0101], p_c = [0110], p_c = [0111], p_c = [1000], p_c = [1001], p_c = [1010], p_c = [1011], p_c = [1100], p_c = [1101], p_c = [1110], p_c = [1111] |
| CL1  | p_c = [x000]_0, p_c = [x000]_1, p_c = [x001]_0, p_c = [x001]_1, p_c = [x010]_0, p_c = [x010]_1, p_c = [x011]_0, p_c = [x011]_1, p_c = [x100]_0, p_c = [x100]_1, p_c = [x101]_0, p_c = [x101]_1, p_c = [x110]_0, p_c = [x110]_1, p_c = [x111]_0, p_c = [x111]_1 |
| CL2  | p_c = [xx00]_00, p_c = [xx00]_01, p_c = [xx00]_10, p_c = [xx00]_11, p_c = [xx01]_00, p_c = [xx01]_01, p_c = [xx01]_10, p_c = [xx01]_11, p_c = [xx10]_00, p_c = [xx10]_01, p_c = [xx10]_10, p_c = [xx10]_11, p_c = [xx11]_00, p_c = [xx11]_01, p_c = [xx11]_10, p_c = [xx11]_11 |
| CL3  | p_c = [xxx0]_000, p_c = [xxx0]_001, p_c = [xxx0]_010, p_c = [xxx0]_011, p_c = [xxx0]_100, p_c = [xxx1]_101, p_c = [xxx0]_110, p_c = [xxx0]_111, p_c = [xxx1]_000, p_c = [xxx1]_001, p_c = [xxx1]_010, p_c = [xxx1]_011, p_c = [xxx1]_100, p_c = [xxx1]_101, p_c = [xxx1]_110, p_c = [xxx1]_111 |

"Type" in TABLE III refers to parent trie node type, where CL0 allows a maximum of 1 entry, CL1 allows a maximum of 2 entries, CL2 allows a maximum of 4 entries, and CL3 allows a maximum of 8 entries.

Finally, because the bitmap of a CSL node that defines prefixes for a CL0 trie node is identical to that of the parent CL0's bitmap, the CSL node may be "promoted" to the parent table, replacing the CL0 therein, provided there is no inode in the original child table. When performing a search, a CSL node that resides in a parent table as opposed to a child table may be distinguished by the fact that the CSL node will be pointed to by an ordinary trie node from the parent table, as opposed to a CL0 trie node parent if the CSL node resides in a child table. Thus a CSL node whose parent is an ordinary trie node is always assumed to contain length 0 prefixes.

Figure 6:
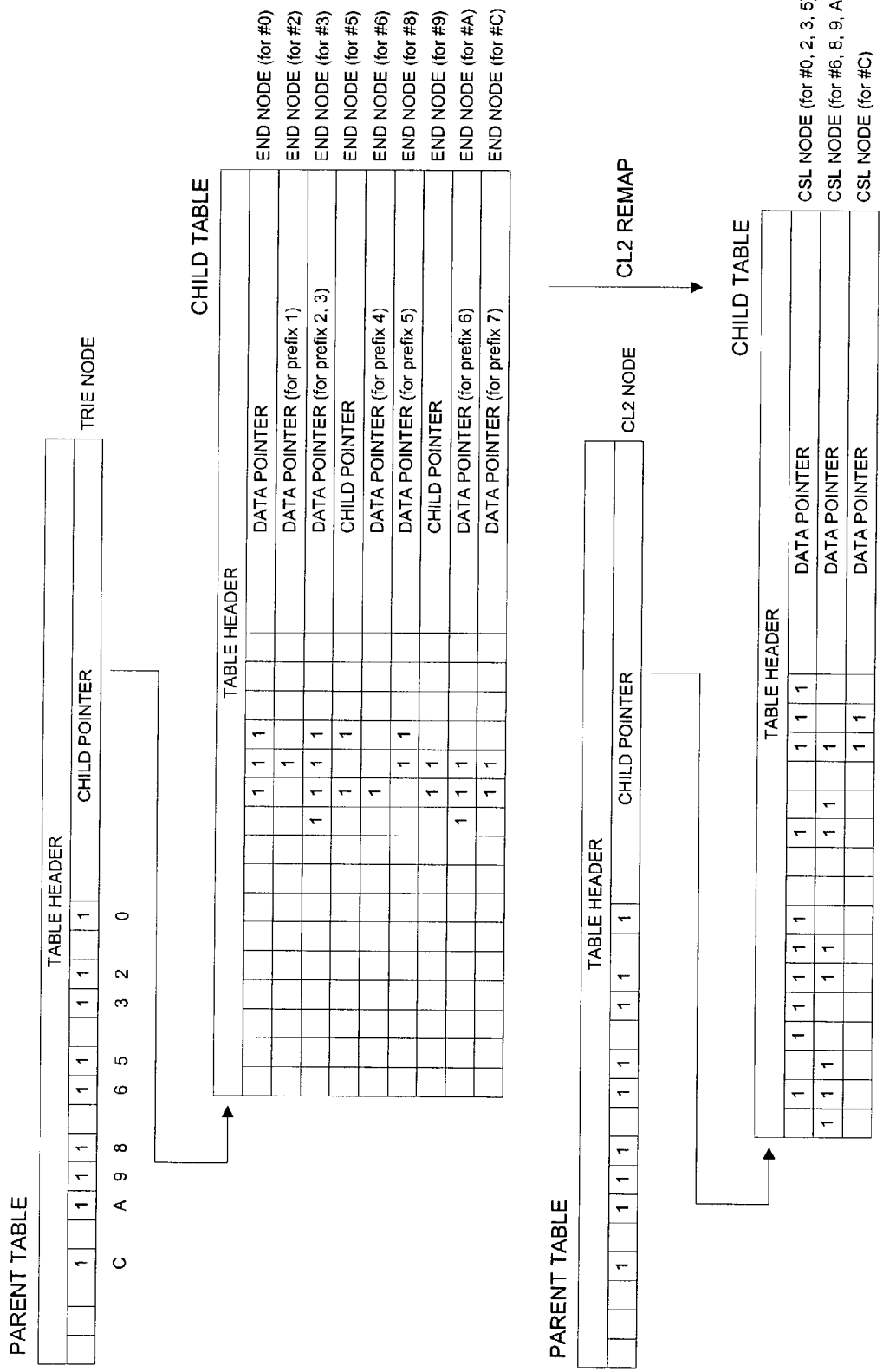
FIG. 6 illustrates trie table entry remappings using multi-bit tries having compressed single length end nodes according to one embodiment of the present invention.

FIG. 6 illustrates trie table entry remappings using multi-bit tries having compressed single length end nodes according to one embodiment of the present invention. FIG. 6 illustrates a CL2 remap, in which a child table having a nine end nodes is remapped to a child table having three CSL node entries (two corresponding to four end nodes each and one corresponding to one end node), saving six table entries.

Simulations of the bitmapped multi-bit trie show that in many applications a large proportion of tables contain only one or two end nodes that represent prefixes of the same length. For instance, if the prefix segment size n is 4 bits and a table contains end nodes that store prefixes that are all the same length, then if the prefixes are of length L*n (where L is the trie level of the table), then a maximum of one end node prefix bit will be set, since the number of prefixes of a particular length stored by an end node is given by $2^{(p-L*n)}$, where p=prefix length, L=level number of the table, and s=segment length. Similarly, if the prefixes are of length (L*n)+1, (L*n)+2 or (L*n)+3, then a maximum of 2, 4 or 8 prefixes per end node respectively can be stored.

Each of these scenarios underutilize the end nodes data pointer by allowing the data pointer to point up to a maximum of 8 data items (and only 1, 2, or 4 for three out of four possible prefix lengths), instead of the maximum allowable 16 data items. This problem can be solved by combining multiple end nodes that encode prefixes of the same length within the same table so that the bitmaps share a common data pointer. For instance, in the example of n=4, a table at level L of the trie contains only end nodes that encode prefixes of length 4L (called length 0 or "CL0" relative to the current table), then there can be up to 16 end nodes, each with only one prefix set in their bitmap. Since there is room for 16 bits in each bitmap, then up to sixteen length 0 end nodes can be combined into a single special end node called a CSL node. Similarly, if a table contains only end nodes that encode prefixes of length 4L+1 (called a length 1 or "CL1" prefix relative to the current table), then again there can be up to 16 end nodes, but each with up to two prefix bits set in the bitmap, allowing up to eight length 1 end nodes to be combined into a single CSL node. Similarly, up to four length 2 ("CL2") and two length 3 ("CL3") end nodes can be combined into a single CSL node.

If the original table contained up to sixteen length 0, length 1, length 2 or length 3 end nodes, the table would be converted into up to one, two, four or eight CSL nodes, respectively. Each of these CSL nodes can have up to the full 16 prefix bits in the bitmap set, and so allows for full utilization of the data pointer. The 1, 2, 4 or 8 bit bitmaps from the original end nodes are always placed in-order in the 16 bit bitmaps of consecutive CSL nodes, thus packing the bitmaps as much as possible.

Once ordinary end nodes have been recoded into CSL nodes, a problem exists for traversing the multi-bit trie during searches: If the CSL node table's parent trie node is not modified, then the hardware that determines which entry to select from the CSL node table based on the trie node bitmap and the segment value will continue to formulate the table index based on the assumption that the child table contains uncompressed end nodes, and will produce a child table index that is up to 16, 8, 4 or 2 times too large for length 0, 1, 2 and 3 tables respectively. An adjustment of the child table index must be made, based on the length of the prefixes compressed into the CSL nodes. If the CSL node prefixes are of length x, then the index into the child table first calculated on the assumption that the table contained ordinary end nodes must be shifted right by x places. Thus, to index a table containing a length 0 CSL node, the index calculated from the parent trie node bitmap and segment value must be shifted right by four places. If the segment length is only 4 bits to begin with, producing a 4 bit child table index, then shifting by 4 places will give an index of 0 in all cases, which is correct because there can be only one length 0 CSL node in a child table. Similarly a index into a table containing length 1, 2 and 4 CSL nodes must be shifted right by 3, 2 or 1 places, respectively, allowing a maximum of 2, 4 or 8 entries to be accessed (which is the maximum number of CSL nodes of the respective type that can occupy a single table).

Since the length of the prefixes encoded by the child table CSL nodes must be known in advance, in order to calculate the correct shift value of the index calculated from the parent trie node, special trie node types must be defined that tell the hardware how many right shifts to perform after calculating the child table index in the standard manner. In the example of segment length n=4 to give four possible prefix lengths, there must be four additional types of trie nodes to instruct the hardware to shift the child table index by 4, 3, 2 or 1 places. These are known as CL0, CL1, CL1 and CL3 nodes, respectively, and are a special type of trie node. Since these special trie node types in the parent table identify the type of CSL node (length 0, 1, 2, 3) in the child table, there is no need for explicitly different CSL child node types, as the type is identified instead by the parent CLx node.

Note that a CL0, CL1, CL2 of CL3 trie node in the parent table still retains the full 16 bit bitmap even though there are less than 16 entries in the child table. This is necessary in order to calculate the correct value of the child table indexing before shifting right to obtain the modified value. The lower bits of the index before modification are also used as an offset into the selected child table CSL node in order to select the appropriate group of compacted prefix bits within the CSL node for the particular child node segment value.

One final optimization can be performed if a child table contains just a single CSL node that encodes length 0 prefixes and there is not inode in the table: under those circumstances that CSL node may be "pulled" into the parent table, where the CSL node entry replaces the original CL0 trie node. To distinguish the pulled CSL node entry from a regular CSL node, the pulled entry is made a special type of node called a CL0 end node (to distinguish the entry from a CL0 trie node). Note that only length 0 CSL nodes can be pulled into the parent table because a length 0 CSL node is the only CSL node type that has a bitmap identical to the parent CL0 trie node's bitmap. Length 1, 2 and 3 CSL nodes have bitmaps that are different from their parent CL1, CL2 or CL3 node's bitmaps and therefore cannot be pulled into the parent table, even if there is only one CL1, CL2 or CL3 node in the child table.

Compression using CSL nodes, and optionally path compression, begins with applying single length prefix optimization. If after insertion or deletion of a prefix, and after applying other optimizations, a table contains only two or more single length normal end nodes (plus optionally an inode), the entries may be converted into one or more CSL nodes. The parent trie node must be converted into the appropriate type (CL0/1/2/3), dependent on the length of prefixes. If a CL0 type trie node (having ct_bitmap=0x0000) references a table with no inode therein (and thus only a single CSL node), the referenced table may be replaced with a CL0 type end node (nh_bitmap=0x0000) that contains the actual prefixes, thus eliminating the child table.

FIG. 7 illustrates table structures for multi-bit trie child tables having compressed single length end nodes according to one embodiment of the present invention. Each child table containing (only) CSL nodes includes a header entry and optionally an inode entry, together with up to 16 length 0 (L0, or 0 bit) prefix portions in one entry, up to 16 length 1 (L1, or 1 bit) prefix portions in two entries, up to 16 length 2 (L2, or 2 bit) prefix portions in four entries, or up to 15 length 3 (L3, or 3 bit) prefix portions in eight entries.

The present invention allows a child table consisting of end nodes which contain prefixes all of the same length to be converted into a compressed format end node called a CSL node, with the parent table's regular trie node being replaced with a special trie node called a CL0, CL1, CL2 of CL3 node in order to identify the length of prefixes in the CSL node child table. In addition, the present invention allows the child table consisting only of length 0 end nodes to be completely pulled in to the parent table as a CL0 end node, and the original child table deleted. This reduces end node table size significantly, improving utilization of prefix memory for a fixed length prefix table and permitting more prefix tables to fit into a given amount of memory.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for utilizing a bitmapped multi-bit trie comprising:
a controller;
a memory;
a search engine, capable of communicating with the controller and the memory, maintaining or utilizing prefix tables for a multi-bit trie including at least one compressed single length (CSL) prefix entry in a child table originally containing a plurality of end node entries, each of the plurality of end nodes containing a prefix portion of identical length,
wherein the at least one compressed single length prefix entries replacing the plurality of end node entries contains prefix portions for the plurality of end node entries.

2. The system according to claim 1, wherein the search engine, upon insertion of a prefix into or deletion of a prefix from the prefix tables, remaps entries within the prefix tables to the one or more compressed single length prefix entries.

3. The system according to claim 1, wherein the prefix tables further comprise:
a parent trie node entry within a parent table for the child table containing the one or more compressed single length prefix entries, the parent trie node entry including, for prefix portions of non-zero length, a bitmap indexing the plurality of end node entries.

4. The system according to claim 1, wherein the prefix tables further comprise:
a parent trie node entry within a parent table for the child table containing the one or more compressed single length prefix entries, the parent trie node entry including, for prefix portions of length zero, only a pointer to the child table containing the plurality of end node entries.

5. The system according to claim 1, wherein the prefix tables further comprise:
a parent trie node entry within a parent table for the child table containing the one or more compressed single length prefix entries, the parent trie node entry including, for prefix portions of length zero, the prefix portions for the plurality of end node entries.

6. The system according to claim 1, wherein the one or more compressed single length prefix entries contain one of sixteen length zero prefix portions, eight length one prefix portions, four length two prefix portions, and two length three prefix portions.

7. The system according to claim 1, wherein the plurality of end node entries comprise all end node entries within the child table.

8. The system according to claim 1, wherein the search engine is a network packet search engine coupled to a system controller and an external memory.

9. A method for utilizing a bitmapped multi-bit trie comprising:
   maintaining or utilizing prefix tables in a memory for a multi-bit trie including at least one compressed single length (CSL) prefix entry in a child table originally containing a plurality of end node entries, each of the plurality of end nodes containing a prefix portion of identical length,
   wherein the at least one compressed single length prefix entries replacing the plurality of end node entries contains prefix portions for the plurality of end node entries.

10. The method according to claim 9, further comprising:
   upon insertion of a prefix into or deletion of a prefix from the prefix tables, remapping entries within the prefix tables to the one or more compressed single length prefix entries.

11. The method according to claim 9, further comprising:
   forming, within the prefix tables, a parent trie node entry within a parent table for the child table containing the one or more compressed single length prefix entries, the parent trie node entry including, for prefix portions of non-zero length, a bitmap indexing the plurality of end node entries.

12. The method according to claim 9, further comprising:
   forming, within the prefix tables, a parent trie node entry within a parent table for the child table containing the one or more compressed single length prefix entries, the parent trie node entry including, for prefix portions of length zero, only a pointer to the child table containing the plurality of end node entries.

13. The method according to claim 9, further comprising:
   forming, within the prefix tables, a parent trie node entry within a parent table for the child table containing the one or more compressed single length prefix entries, the parent trie node entry including, for prefix portions of length zero, the prefix portions for the plurality of end node entries.

14. The method according to claim 9, further comprising:
   forming the one or more compressed single length prefix entries with one of sixteen length zero prefix portions, eight length one prefix portions, four length two prefix portions, and two length three prefix portions.

15. The method according to claim 9, wherein the plurality of end node entries comprise all end node entries within the child table.

16. The method according to claim 9, wherein the maintaining and utilizing the prefix tables with a network packet search engine coupled to a system controller and an external memory.

17. A bitmapped multi-bit trie comprising:
   prefix tables for a multi-bit trie, stored in a machine usable medium, including at least one compressed single length (CSL) prefix entry in a child table originally containing a plurality of end node entries, each of the plurality of end nodes containing a prefix portion of identical length,
   wherein the at least one compressed single length prefix entries replacing the plurality of end node entries contains prefix portions for the plurality of end node entries.

18. The trie according to claim 17, wherein, upon insertion of a prefix into or deletion of a prefix from the prefix tables, entries within the prefix tables are remapped to the one or more compressed single length prefix entries.

19. The trie according to claim 17, wherein the prefix tables further comprise:
   a parent trie node entry within a parent table for the child table containing the one or more compressed single length prefix entries, the parent trie node entry including, for prefix portions of non-zero length, a bitmap indexing the plurality of end node entries.

20. The trie according to claim 17, wherein the prefix tables further comprise:
   a parent trie node entry within a parent table for the child table containing the one or more compressed single length prefix entries, the parent trie node entry including, for prefix portions of length zero, only a pointer to the child table containing the plurality of end node entries.

21. The trie according to claim 17, wherein the prefix tables further comprise:
   a parent trie node entry within a parent table for the child table containing the one or more compressed single length prefix entries, the parent trie node entry including, for prefix portions of length zero, the prefix portions for the plurality of end node entries.

22. The trie according to claim 17, wherein the one or more compressed single length prefix entries contain one of sixteen length zero prefix portions, eight length one prefix portions, four length two prefix portions, and two length three prefix portions.

23. The trie according to claim 17, wherein the plurality of end node entries comprise all end node entries within the child table.

24. The trie according to claim 17, wherein the prefix tables are located within a network packet search engine coupled to a system controller and an external memory.

* * * * *